Feb. 17, 1931.  B. A. PLIMPTON  1,793,191
INSULATOR PIN
Filed May 6, 1926
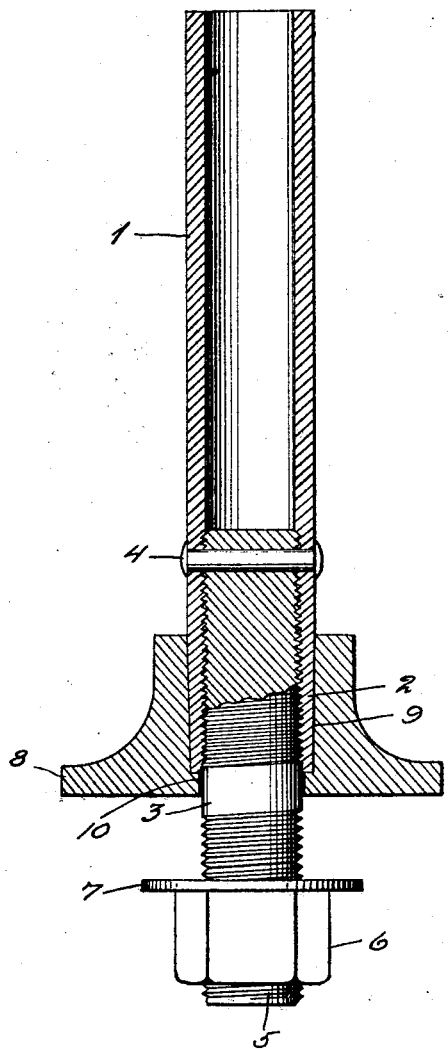

Patented Feb. 17, 1931

1,793,191

UNITED STATES PATENT OFFICE

BENTLEY A. PLIMPTON, OF BALTIMORE, MARYLAND, ASSIGNOR TO LOCKE INSULATOR CORPORATION, OF BALTIMORE, MARYLAND, A CORPORATION OF MARYLAND

INSULATOR PIN

Application filed May 6, 1926. Serial No. 107,168.

The invention relates to insulator supports, particularly those of the pin type.

The principal object of the invention, generally stated, is to provide an insulator pin which may be constructed more economically than the usual type or variety without sacrificing any of the benefits incident to one of more expensive construction.

The object of the invention, more specifically stated, is to provide an insulator supporting pin including a pipe section of suitable length having secured thereto a stud, the pipe being rotatably mounted with respect to a suitable base which may be for the flat or roof type arm, the rotatability being for the purpose of bringing the groove in the insulator carried by the pin in proper position to receive a transmission line conductor.

A further object of the invention is to provide a pin in which the stud may be secured within the pipe in different ways and in which the connection of the pipe with the base may be varied.

A further object of the invention is to provide an insulator pin embodying a pipe adapted to carry a thimble which may be cast, threaded or otherwise secured thereon, the pipe having secured therein a stud, the invention including the combination with the pin of a base formed to provide a swivel for the pin so that the latter may be turned to bring the slot or groove in the insulator carried thereby into proper position to receive the line conductor.

A further object of the invention is to provide a pin in which the pipe member has a tapered fit within the base so that when the pin is drawn down and secured by the nut provided on the stud a tight fit will be insured and any looseness, wabbling or accidental turning of the pin entirely prevented.

To the attainment of the foregoing and other objects and advantages as will hereinafter appear, the invention preferably consists in the detailed construction and the arrangement and combination to be more fully described and claimed and illustrated in the accompanying drawing in which:

The figure is a longitudinal section through the preferred form of pin constructed in accordance with the invention.

Referring more particularly to the drawing, I have shown the pin as comprising a pipe section 1 of suitable length and of any desired external and internal diameter. At one end this pipe is adapted to have secured thereon, in any preferred manner, a thimble, not shown, for supporting an insulator. At its other end the pipe is swedged to give it a slight taper as indicated at 2 for cooperation with a base to be described. Secured within the second named or lower end of the pipe is a stud 3 of proper length to extend through the cross arm on which the pin is to be mounted and in the drawing the stud is represented as screwed into the pipe which is necessarily threaded for the purpose. Clearly, the threading might be omitted and the stud be formed smooth throughout that portion which is located within the pipe. To prevent subsequent rotation of the pin with respect to the pipe use may be made of a rivet 4 or the like passing transversely through the pipe and the stud. The projecting portion of the stud is threaded at 5 for the reception of the usual nut 6 beneath which is customarily placed a washer 7 adapted to bear against the underside of the cross arm.

In conjunction with the pin use is made of a base 8 which may be constructed for use upon either the flat or roof type of cross arm, this detail being immaterial. The base is represented as having a slightly tapered recess 9 therein of the same pitch as the swedged end 2 of the pipe. The recess 9 terminates short of the bottom and the main portion of the material at the bottom is formed with a hole 10 of sufficient diameter to permit the stud 3 to pass therethrough.

In the use of this type of pin it is evident that it is mounted upon a cross arm, not shown, in the usual manner. Prior to the tightening of the nut 6 the pipe together with the stud 3 may be rotated with respect to the base owing to the fact that at this time there is a loose fit between the swedged end 2 and the tapered socket or recess 9. The insulator is of course secured upon the pin 1 as is customary and in order to bring the groove provided in such insulators into proper position to receive the line conductor, a suitable wrench or the like may be engaged upon the pipe for effecting turning thereof inasmuch as it is not possible to turn the insulator with respect to the pin. After the proper position has been reached the nut 6 is tightened so as to draw the pin down into place with respect to the cross arm. When this is done the taper at the swedged end of the pipe will cause a jamming engagement with the tapered socket or recess so that the pin will be held firmly and be positively prevented from any accidental displacement either laterally or rotatably.

From the foregoing description and a study of the drawing it will be apparent that I have thus provided an insulator pin which may be constructed more cheaply than the usual type inasmuch as it is not made of bar stock but is built up of a short stud and a pipe section, these materials costing less and the labor involved in assembling the stud within the pipe being less than that involved in turning down solid bar stock on a lathe as is the practice in forming pins of the usual and well known types. When this type of pin is used it is possible to employ a base of malleable iron instead of one of forged steel and it has been discovered that it is not necessary to machine the fit where the slightly tapered portion of the pipe goes through the base. Naturally, all parts should be galvanized to prevent rusting or corroding.

While I have shown and described one form of the invention, it should be distinctly understood that this is merely an illustration of possibilities inasmuch as it is quite conceivable that other detailed means may be adopted or employed for effecting connection or mounting of the parts. I reserve the right to make all such changes as will widen the field of utility and increase the adaptability of the invention provided such variations constitute no departure from the spirit of the invention or the scope of the claim hereunto appended.

Having thus described the invention, I claim:

In an insulator pin structure, a base having a tapered socket extending partly therethrough and having a circular hole of less diameter than the socket thereby providing a flange at the bottom of the socket, a pipe member having a tapered end rotatably engaged within said socket, and upon said flange, and a stud secured within said end of the pipe and projecting therebeyond and through said hole for effecting mounting of the structure upon a cross arm.

In testimony whereof I affix my signature.

BENTLEY A. PLIMPTON.